United States Patent [19]
Tyll et al.

[11] Patent Number: 5,684,389
[45] Date of Patent: Nov. 4, 1997

[54] SWITCH-OFF METHOD FOR A THREE-PHASE REACTIVE POWER COMPENSATOR WITH TWO THYRISTOR SWITCHES

[75] Inventors: Heinz Tyll; Frank Schettler, both of Erlangen, Germany

[73] Assignee: Siemens Aktiengesellschaft, Munich, Germany

[21] Appl. No.: 580,284

[22] Filed: Dec. 27, 1995

[30] Foreign Application Priority Data

Dec. 27, 1994 [DE] Germany ............. 44 46 864.4

[51] Int. Cl.[6] ...................................................... G05F 1/70
[52] U.S. Cl. ............................................................ 323/209
[58] Field of Search ................................. 303/209, 210, 303/211; 323/209, 210, 211

[56] References Cited

U.S. PATENT DOCUMENTS

| | | | |
|---|---|---|---|
| 4,356,441 | 10/1982 | Putman et al. | 323/210 |
| 4,571,535 | 2/1986 | Gyugyi | 323/211 |
| 5,434,497 | 7/1995 | Larsen | 323/209 |

*Primary Examiner*—Peter S. Wong
*Assistant Examiner*—Derek J. Jardieu
*Attorney, Agent, or Firm*—Herbert L. Lerner; Laurence A. Greenberg

[57] ABSTRACT

A switch-off method for a three-phase solid state reactive power compensator for a rotary three phase power system has first and second thyristor valves receiving respective first and second firing signals, and three capacitors. The firing signals are suppressed to a point in time for first turning off the second firing thyristor valve in immediately successive phases in direction of rotation of the three-phase power system.

7 Claims, 5 Drawing Sheets

SWITCH-OFF METHOD FOR A THREE-PHASE REACTIVE POWER COMPENSATOR WITH TWO THYRISTOR SWITCHES

BACKGROUND OF THE INVENTION

FIELD OF THE INVENTION

The invention relates to a switch-off method for a three-phase reactive power compensator of a solid state compensator system, which has two thyristor valves and three capacitors.

Electrical power grids serve primarily to transmit active power. The power generated and the power consumed must always be in equilibrium, otherwise frequency changes occur. Just as with the active power balance, the reactive power balance must also always be equalized enough to ensure that tolerable voltage conditions prevail in the grid. The reactive power is responsible above all for the voltage level. The balance of active and reactive power in the grid must be equalized at every moment in such a way that the voltage and frequency are within the specified limits.

The quality of the electrical energy being supplied depends largely on the reactive power conditions in the grid. The operating voltage should remain within specified limits during normal operation within the entire grid. If defects arise, a transient increase in voltage, for instance, must not exceed the rated limit for the grid equipment. Changes in load conditions and changes in the grid configuration resulting from defects and switching events cause voltage changes in the grid, which can be quite pronounced, especially at a low grid short circuit power level.

Given increasing demand, with only limited options for expanding the power grids, energy transmission grids are being subjected to more and more intensive use. Reactive power flows in the grid are the main cause of voltage drops and other grid losses. Through targeted use of reactive power elements, such as capacitors and coils, an equalized reactive power balance can be attained and its effect on the grid voltage and grid losses can be reduced. The varying dynamic demands can be covered with switchable or regulatable reactive power elements. However, a continuous, dynamic change is only possible in practice if current rectifier circuits are used. At present, solid state compensators made by thyristor technology are the most economical way to achieve dynamic reactive power compensation.

The solid state compensator, which is also known as a Static VAr Compensator (SVC), includes one or more parallel-connected inductive and capacitive branches, which are connected to the high-voltage power grid through a dedicated transformer or through a tertiary winding of a grid transformer. Due to the fixation of the rated voltage on the secondary side, the use of a dedicated transformer offers the possibility of optimally constructing equipment in terms of current and voltage stress. In medium-voltage power grids of up to 30 kV, a direct connection can also be economical.

The capacitive power is provided through fixedly connected capacitors that are also known as Fixed Capacitors (FC), or switched capacitors which are also called Thyristor Switched Capacitors (TSC). In that application, a thyristor switch which is normally used for that purpose includes a plurality of series-connected, antiparallel thyristors. The capacitor must then be provided with a protective inductor in order to limit the steepness of the turn-on current. The use of mechanically switched capacitors is subject to limitations in terms of operation. In order to keep compensation processes upon turn-on as slight as possible and thus to preclude overloads, the capacitor upon turn-on must always be discharged through a power switch (for instance through a discharging resistor or a discharging converter). By comparison, a thyristor valve used as the switch offers the advantage of permitting the capacitor to be turned on and off from any charge state and arbitrarily often, with the least possible compensation process. The "intelligence" of the control required therefor is easy to achieve in digital technology.

The inductive power is provided through the use of inductive coils. They may either be switched or, given suitable control in the fundamental oscillation reactive power, they may also be regulated (TCR, Thyristor Controlled Reactor). In this way the entire reactive power output to the grid by the solid state compensator can be adjusted in infinitely graduated fashion within the limits of the required capacitive or inductive reactive power at the grid junctions.

The continuous regulation of a TCR branch is always associated with generation of harmonic currents, which must be kept away from the transfer net by the use of filters at the connection point of the TCR. Generating harmonics can be entirely precluded only by providing that the inductive branch, just like the capacitive branch, is operated in switched fashion (TSR, Thyristor Switched Reactor). The installed inductive reactive power is then likewise merely turned on or off.

Besides such components as transformers, inductances, capacitors and power semiconductors, high-voltage and medium-voltage switchgear, cooling devices, devices for open-loop and closed-loop control and protection, and auxiliary energy supplies, are necessary.

Fundamentally, the solid state compensator can perform various control tasks. When used in transfer grids, that is primarily the task of voltage control. Thus the solid state compensator can also contribute to limiting operating-frequency overvoltages, can provide a contribution to improving grid stability and can also damp power fluctuations between subgrids.

In an article entitled "Stromrichter fur statische Blindstrom-Kompensatoren" [Rectifiers for Static Reactive Current Compensators"], printed in the German journal "Siemens-Energietechnik" [Siemens Energy Technology], Vol. 3, No. 11–12, 1981, pp. 353–357, an SVC system is described that includes a thyristor switched capacitor bank (TSC) and a thyristor controlled reactor (TCR). Those reactive power compensators of the SVC system are each defined in three-phase fashion, and the phases of each three-phase reactive power compensator are constructed identically. In other words, a thyristor switch capacitor bank (TSC branch) includes a three-phase thyristor valve, which is accommodated in a valve frame, and many serial-connected and parallel-connected capacitance units (cans), which are mounted in a rack. A triggering and monitoring system is also shown and described.

In a three-phase reactive power compensator which is known from German Published, Non-Prosecuted Application DE 44 23 033 A1, two phases each include one capacitor that can be turned on through the use of a thyristor valve, and a third phase including only a capacitor.

As a result of that construction of a three-phase reactive power compensator, one less thyristor valve is needed. Since a three-phase reactive power compensator also has cooling devices and devices for open-loop and closed-loop control, for protection and for auxiliary energy supply, there is a corresponding savings of those components when there is one less thyristor valve. As a result, a thus-constructed three-phase reactive power compensator needs less space, which considerably reduces the space required for an SVC system including a plurality of such reactive power compensators (TSR branch, TSC branch), so that such a reactive power compensator can, for instance, be accommodated in a container. As a result, depending on the power involved, a mobile reactive power compensator or a mobile SVC system is obtained.

In that three-phase reactive power compensator, the two thyristor valves, upon being extinguished, are loaded with a higher voltage than occurs in conventional reactive power compensators that are constructed similarly in all three phases. That voltage is a combined voltage, composed of a direct voltage component and an alternating voltage component. Thus some of the economy (one thyristor valve with associated components of the system) of the reactive power compensator is lost again because of the more-complicated and expensive layout of the remaining thyristor valves.

SUMMARY OF THE INVENTION

It is accordingly an object of the invention to provide a switch-off method for a three-phase reactive power compensator with two thyristor switches, which overcomes the hereinafore-mentioned disadvantages of the heretofore-known methods of this general type and through the use of which a voltage load on a first thyristor valve to be extinguished in the reactive power compensator is reduced considerably.

With the foregoing and other objects in view there is provided, in accordance with the invention, a switch-off method for a three-phase solid state reactive power compensator for a rotary three phase power system having first and second thyristor valves receiving respective first and second firing signals, and three capacitors, which comprises suppressing the firing signals to a point in time for first turning off the second firing thyristor valve in immediately successive phases in direction of rotation of the three-phase power system.

Due to this defined control of the turn-off order, the voltage load on the first thyristor valve to be extinguished is reduced considerably. The voltage load on the second thyristor valve to be extinguished is not changed thereby.

In accordance with a concomitant mode of the invention, a time window is determined within which the time for suppression of the ignition signals for the two thyristor valves is arbitrarily located. This time window begins at a zero crossing of a valve current of the thyristor valve that is the second one to be extinguished, and it ends at a zero crossing of the next valve current in chronological succession. When a turn-off signal of a higher-order controller is present within this indicated slot, the thyristor valves are extinguished in the intended order. Outside this time window, if a turn-off signal from a higher-order controller of the solid state compensator is present, the ignition signals for the two thyristor valves are not suppressed.

Other features which are considered as characteristic for the invention are set forth in the appended claims.

Although the invention is illustrated and described herein as embodied in a switch-off method for a three-phase reactive power compensator with two thyristor switches, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
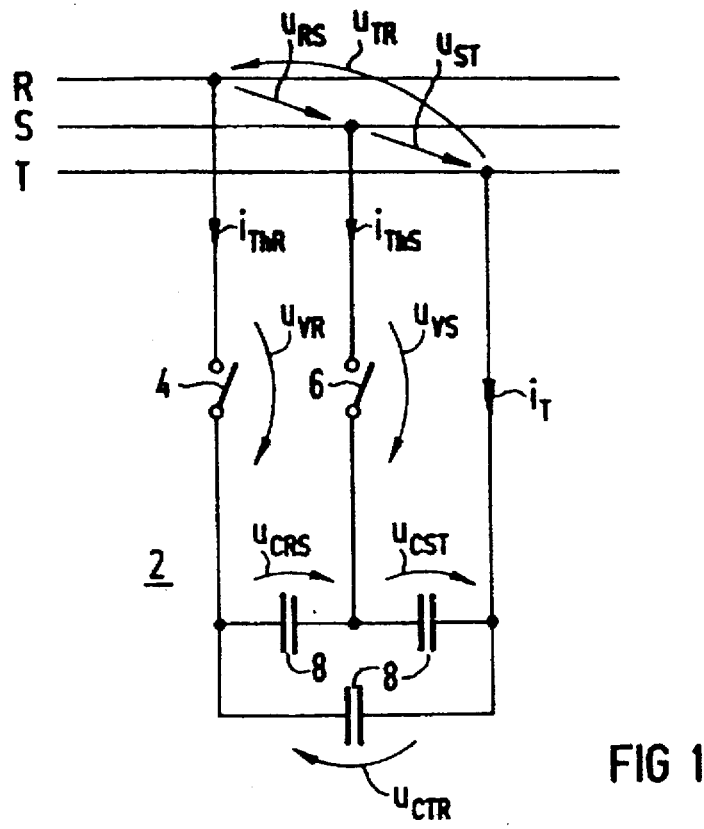
FIG. 1 is a schematic circuit diagram of a first embodiment of a known reactive power compensator, which is constructed as a thyristor-switched capacitor bank.
Figure 3:
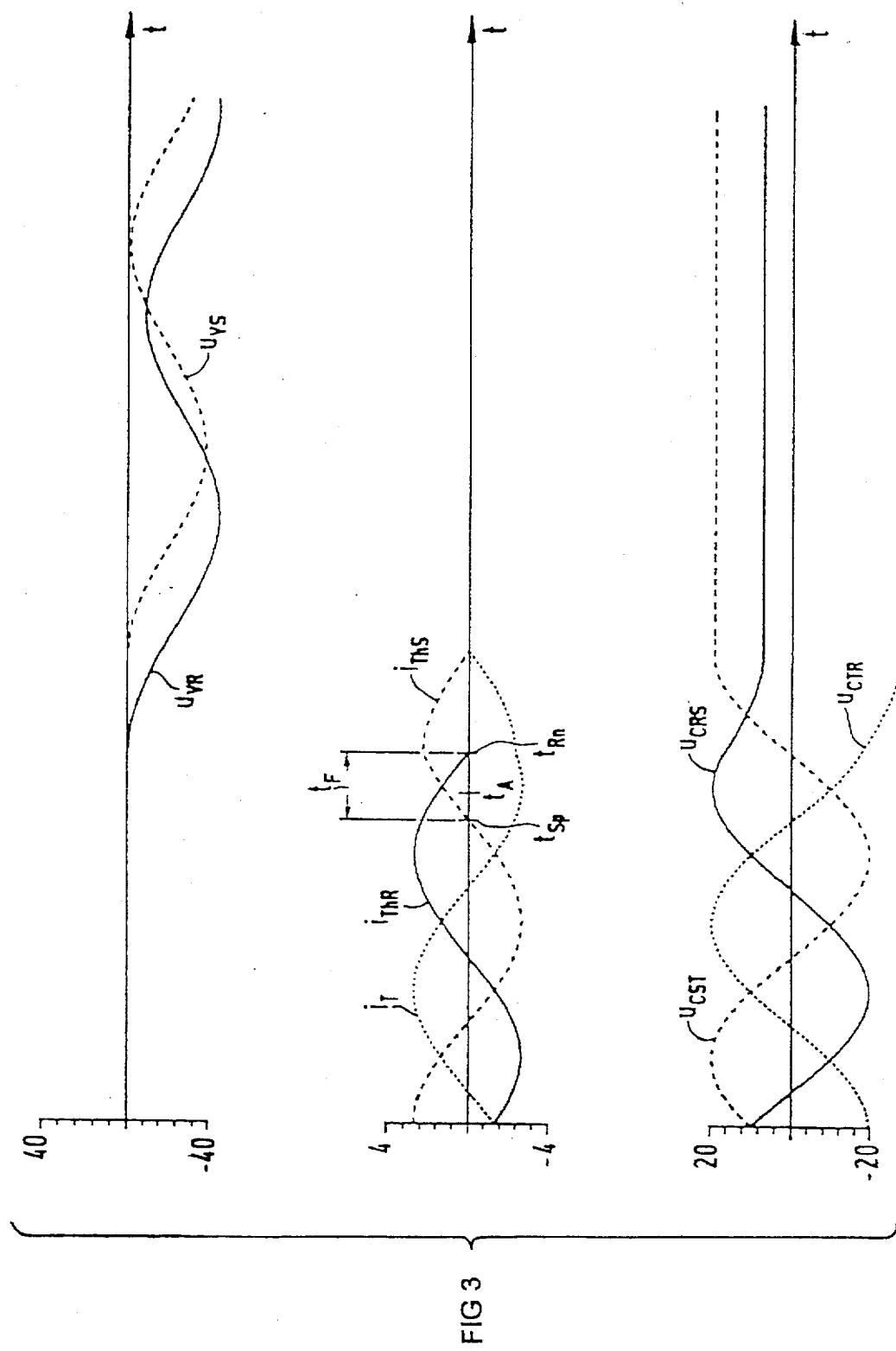
FIG. 3 includes several diagrams showing functions over time of signals of the embodiment of FIG. 1 without the method according to the invention.
Figure 4:
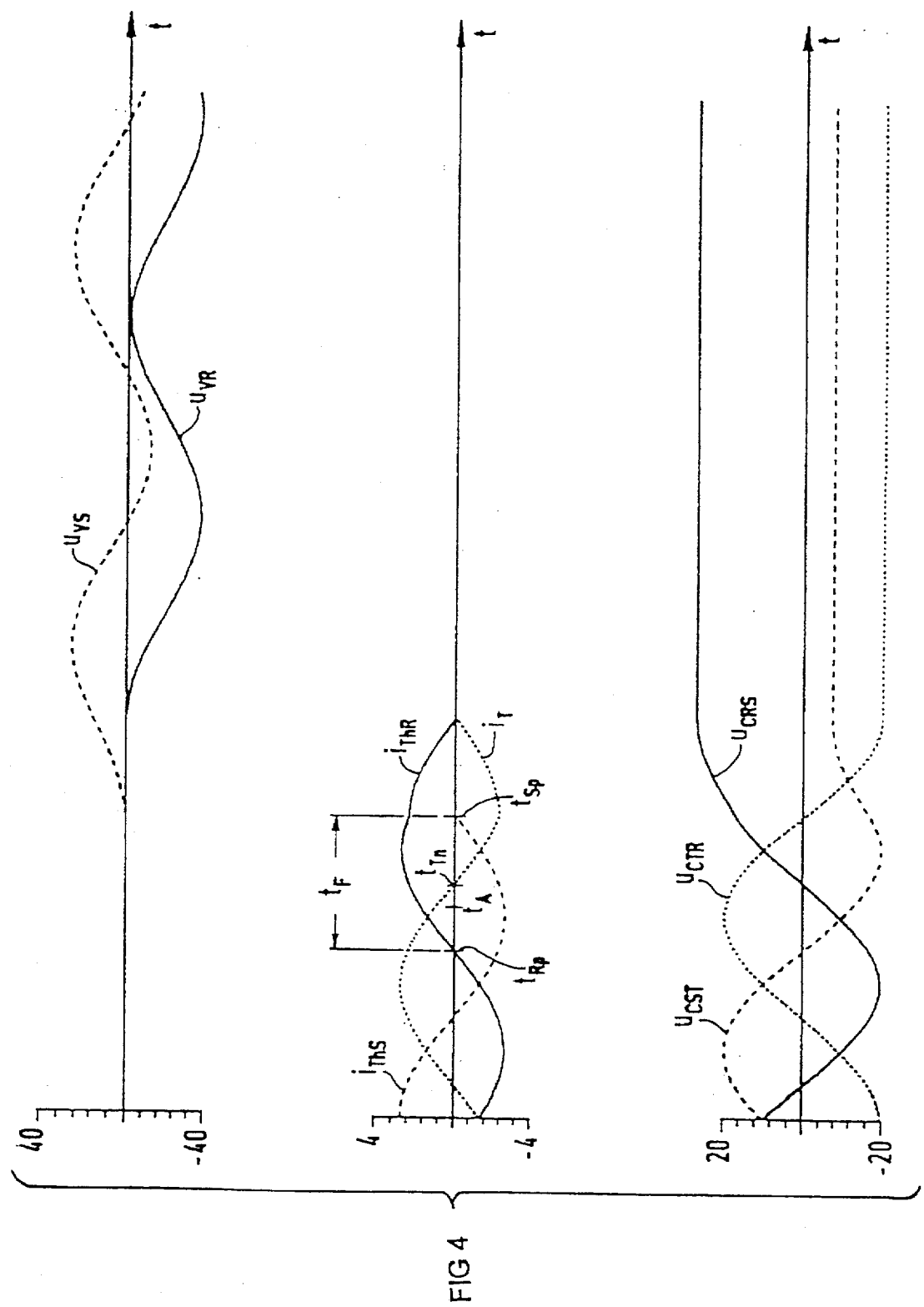
FIG. 4 includes several diagrams showing functions over time when the method of the invention is used.

Referring now to the figures of the drawing in detail and first, particularly, to FIG. 1 thereof, there is seen an equivalent circuit diagram of a three-phase reactive power compensator 2 of a non-illustrated solid state reactive power compensation system of a rotary current grid. The reactive power compensator 2 is known from German Published, Non-Prosecuted Application DE 44 23 033 A1. The reactive power compensator 2 has one respective power switch 4, 6, for instance a thyristor valve, in each of two phases R, S only. Three capacitors 8 which are also provided are connected electrically in delta fashion and are connected to respective phases R, S and T of the rotary current grid through the use of the phase conductors R, S and T. That kind of reactive power compensator 2 is also known as a thyristor-switched capacitor TSC. The thyristor valves 4 and 6 each include two antiparallel thyristor columns with wiring elements and thyristor electronics. The precise layout of such thyristor valves is well known and is described and shown, for instance, in the article "Stromrichter fur statische Blindstrom-Kompensatoren" [Rectifiers for Static Reactive Current Compensators"] referred to above. Signals which are designated in the equivalent circuit diagram, namely: a valve current $i_{ThR}$, $i_{ThS}$, a capacitor voltage $u_{CRS}$, $u_{CST}$, $u_{CTR}$ and a valve voltage $u_{VR}$, $u_{VS}$ are each shown in a respective diagram in FIGS. 3 and 4 in which they are plotted over time t. FIG. 3 shows a former turn-off process and FIG. 4 shows a turn-off of the TSC, by taking the turn-off method according to the invention into account.

In switching off the reactive power compensator 2 of the known art, a turn-off signal from a primary controller for the solid state reactive power compensation system causes a suppression of the control signals of the thyristor valves 4 and 6, so that upon the zero crossing of the current, these thyristor valves 4 and 6 are extinguished. No consideration is given to which one of the thyristor valves 4 or 6 is extinguished first. It can be determined from the signal functions shown for the valve currents $i_{ThR}$ and $i_{ThS}$ of FIG. 3 that the turn-off signal from the primary control system was generated in a time window $t_F$, since the valve current $i_{ThR}$ is extinguished at a time $t_{Rn}$. The time window $t_F$ is determined arbitrarily in this example from the zero crossings of the current in the respective phases of the valve currents at times $t_{Sp}$ and $t_{Rn}$. This means that if the switch-off signal is generated by the system controller after an arbitrary zero crossing of the current, then the valve current at the next following zero crossing is extinguished first. As a result, either the phase R or the phase S is extinguished first. In FIG. 3, the associated capacitor voltages $u_{CRS}$, $u_{CST}$, $u_{CTR}$ and the valve voltages $u_{VR}$ and $u_{VS}$ are shown. From these diagrams it can be seen that the capacitor voltages $u_{CRS}$, $u_{CST}$ and $u_{CTR}$ have different amplitudes, and that each of the valve voltages $u_{VR}$ and $u_{VS}$ are combination voltages, each formed of a direct and an alternating voltage component. In this illustrated case, in which it happens that the phase R is extinguished first, a maximum voltage occurs at the thyristor valve 4 of 2.366 pu, wherein pu is equal to the conductor-to-conductor voltage of the rotary current grid. The maximum voltage at the thyristor valve 6 is equal to 2.0 pu. Since in the conventional turn-off process the sequence of turn-off of the thyristor valves 4 and 6 is not fixed, these valves 4 and 6 must be constructed for the maximum incident valve voltage, which is 2.366 pu.

If the turn-off method of the invention is employed, then the ignition signals of the thyristor valves 4 and 6 are suppressed at a time $t_A$ in such a way that the thyristor valve 6 in the second location in the direction of rotation of the three-phase system is extinguished first. This means that the turn-off signal of the system controller does not lead immediately to suppression of the ignition signals of the thyristor valves 4 and 6. Instead, a check is made as to which one of the zero crossings of the current arrives. In other words, a determination is made as to which time window $t_F$ is momentarily present. In order to make the thyristor valve 6 of the phase S be the first to be extinguished, the ignition signals for the thyristor valves 4 and 6 must be suppressed only within certain time windows $t_F$. In the illustrated example of FIG. 4, the turn-off signal of the system controller must have been generated in the time window $t_F$, which is identified by a starting time $t_{Rp}$ and the ending time $t_{Sp}$, for example at the time $t_A$. As a result, the valve current $i_{ThS}$ is extinguished first. The respective capacitor voltages $u_{CRS}$, $u_{CST}$ and $u_{CTR}$ which are also shown, also have different amplitudes as in the conventional method. Since a particular turn-off sequence is followed, different valve voltage functions $u_{VR}$ and $u_{VS}$ result. They still have direct voltage components and alternating voltage components, but their maximum instantaneous value has been reduced considerably. The maximum amplitude at the thyristor valve 6 (the first one to be extinguished) is 1.366 pu, and the maximal amplitude at the thyristor valve 4 (phase R) is 2.0 pu. Thus the maximum voltage that occurs, for which the thyristor valves 4 and 6 must at maximum be constructed, is only 2.0 pu.

Figure 2:
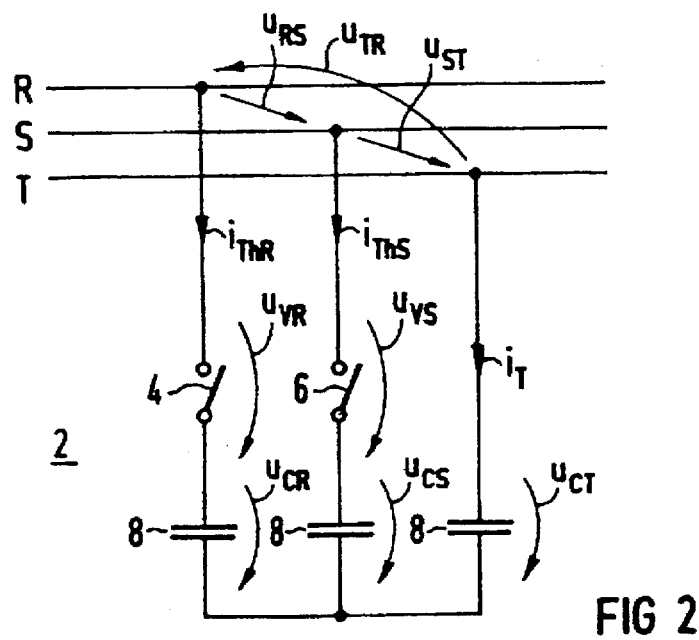
FIG. 2 is a view similar to FIG. 1 of a second exemplary embodiment of the known reactive power compensator.
Figure 5:
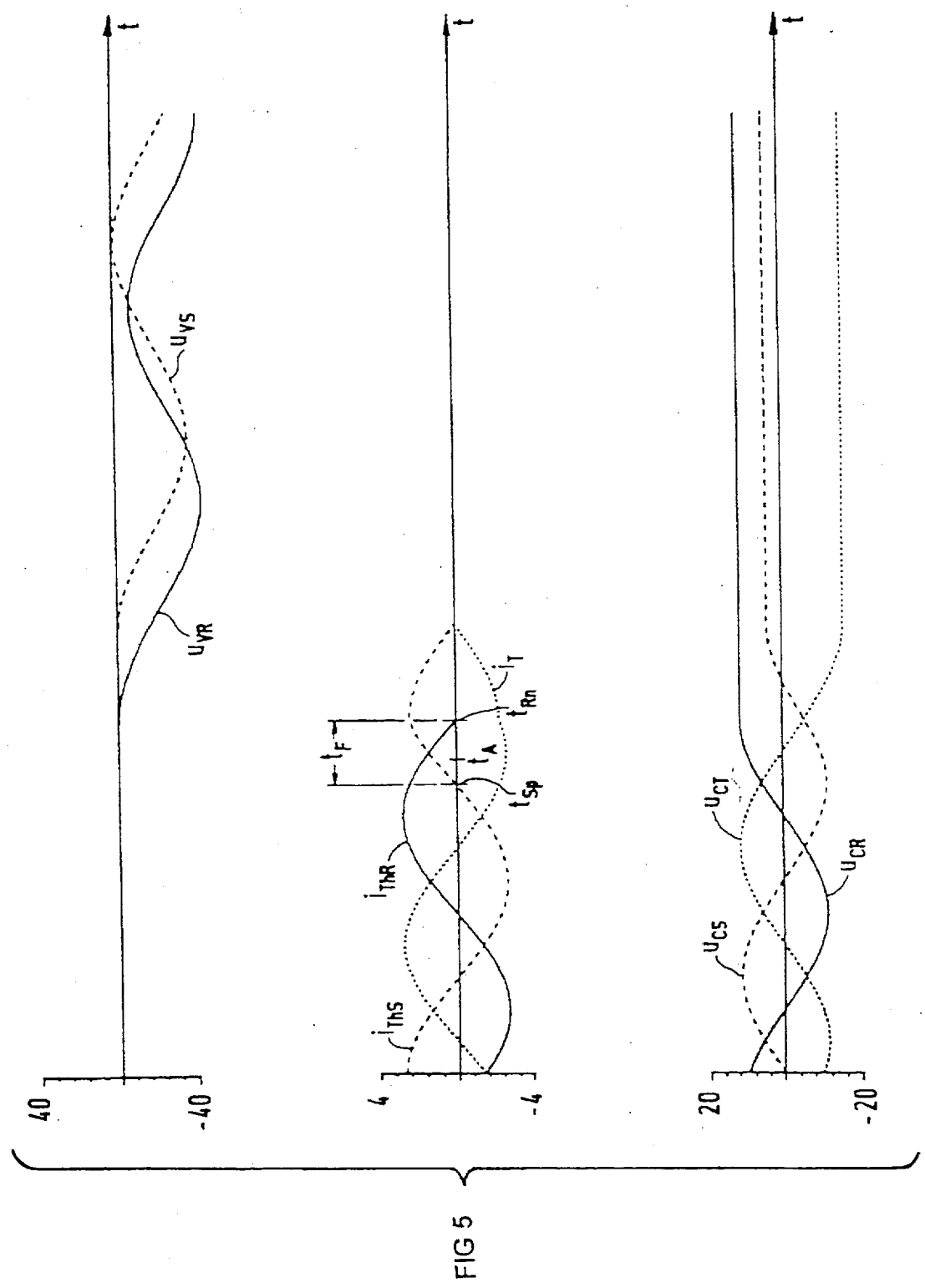
FIG. 5 includes several diagrams showing functions over time of signals of the embodiment of FIG. 2 without the use of the turn-off method of the invention.
Figure 6:
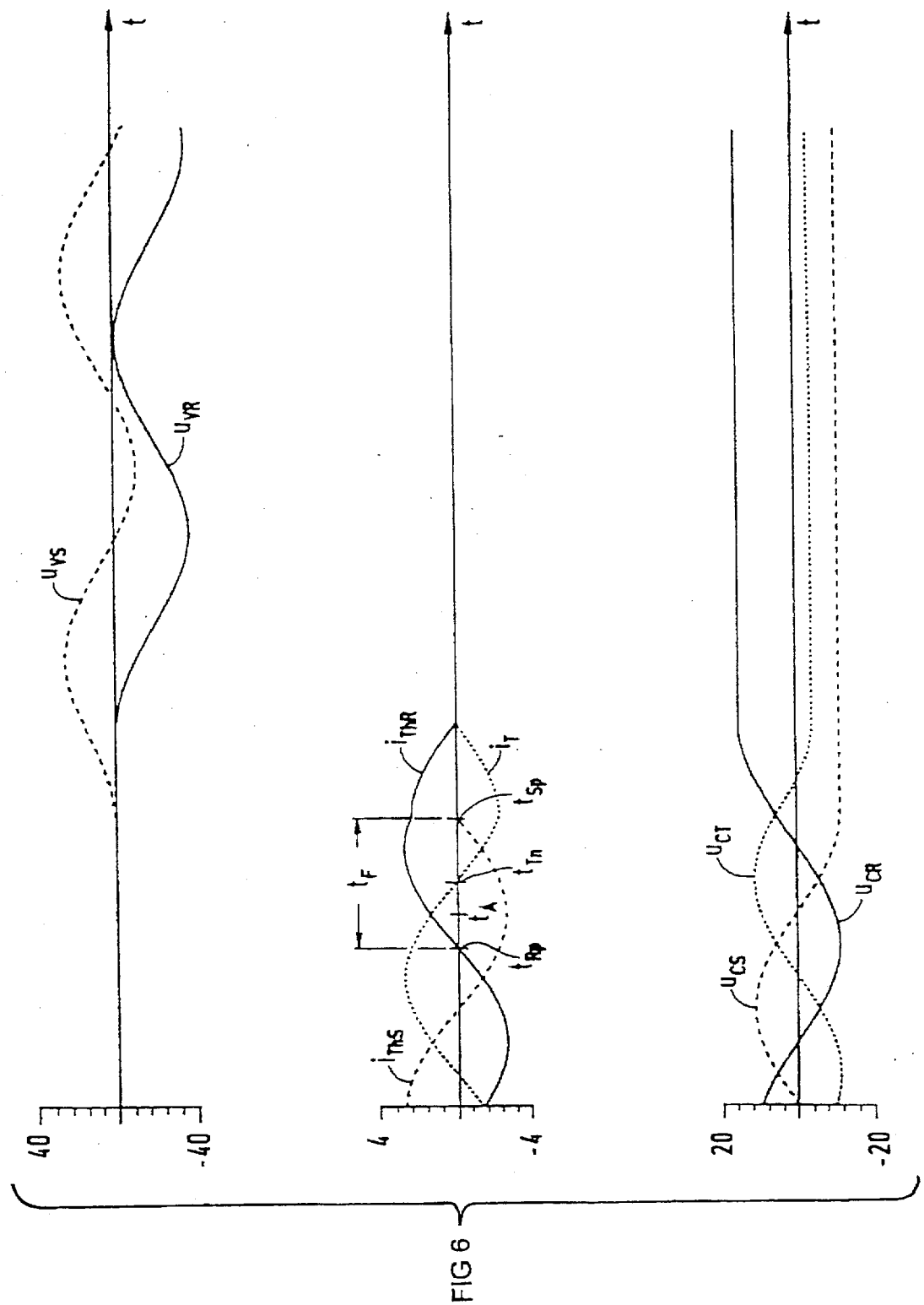
FIG. 6 includes several diagrams showing functions over time of signals when the method of the invention is used.

FIG. 2 shows an equivalent circuit diagram of a second embodiment of the three-phase reactive power compensator 2 of a solid state reactive power compensation system SVC (Static VAr Compensator). In this embodiment, the capacitors 8 are electrically connected in star-point fashion, the thyristor valves 4 and 6 are again located in the phases R and S which maintains similarity with the first embodiment. The associated signal functions are shown in FIGS. 5 and 6. FIG. 5 shows the signal functions of a conventional turn-off operation, and FIG. 6 shows these signal functions in a turn-off operation using the fixed turn-off order. In this embodiment of the reactive power compensator 2, the same maximum voltage strains on the thyristor valves 4 and 6 are again obtained. The maximum voltage at the thyristor valve 6 (the first to be extinguished) is 1.366 pu, and at the second valve 4 to be extinguished is 2.0 pu.

With the turn-off method according to the invention, as a result of which a specified turn-off order is adhered to, the maximum valve voltage that ever occurs is a voltage of 2.0 pu, regardless of whether the capacitors 8 of the reactive power compensator 2 are connected electrically in a delta or a star-point connection.

If the thyristor valves 4 and 6 are disposed in the phases S and T or T and R instead, then in the turn-off method of the invention the thyristor valve in the phase T will be extinguished first, before the phase S, or the one in the phase R will be extinguished first, before the phase T.

We claim:

1. A method for switching-off a three-phase reactive-power controller of a static reactive power compensator, which comprises:

providing a reactive-power controller of a three-phase system with three capacitors and a first and second thyristor valve respectively associated with a leading and lagging one of two of three phases;

suppressing firing signals of the first and second thyristor valves such that the second thyristor valve is always switched off before the first thyristor valve.

2. The method according to claim 1, which further comprises the step of defining a time window, starting at a zero crossing of a current through the first thyristor valve and ending at a zero crossing of a current through the second thyristor valve, and optionally suppressing the ignition signals within the time window.

3. The method according to claim 1, which further comprises the steps of detecting a switch-off signal for switching off the static reactive power compensator; determining whether a zero crossing of a current through the first or second thyristor was a last zero crossing; and allowing the firing signals of the first and second thyristor valves to be suppressed when the zero crossing of the first thyristor was last.

4. A method for switching-off a three-phase reactive-power controller of a static reactive power compensator, which comprises:

providing a reactive-power controller having two thyristor valves switched with firing signals and three capacitors; and suppressing the firing signals of the two thyristor valves at a time instant in such a way that the thyristor valve which is second of the two thyristor valves in a sense of rotation of the three-phase system is turned off first.

5. The method according to claim 4, which further comprises: defining a time window, in which the time instant can be anywhere, which time window starts at a zero crossing of a valve current of the thyristor valve which is turned off second and ends at a zero crossing of a valve current of the thyristor valve of the respective-power controller that is turned off first.

6. A control device for controlling a three-phase reactive power controller of a static compensator, the reactive power controller having three capacitors and a first and second thyristor valve respectively associated with a leading and a lagging one of two of three phases of the three-phase system, the control device comprising a delay device connected to the first and second thyristor valves for switching off the second thyristor valve prior to the first thyristor valve.

7. The control device according to claim 6, including an ignition assembly supplying ignition signals to the thyristors, and wherein the delay device determines whether the zero crossing of the current of the first or second thyristor was last and wherein the ignition assembly is able to suppress the ignition signals only when the last zero crossing was the zero crossing of the current of the first thyristor.

* * * * *